United States Patent [19]

Mizukami et al.

[11] Patent Number: 5,153,791
[45] Date of Patent: Oct. 6, 1992

[54] HIGHLY COMPACT CASSETTE PLAYER

[75] Inventors: Tatsuto Mizukami; Kazunori Kono; Kanji Okumoto, all of Osaka, Japan

[73] Assignee: Matsushita Electric Industrial Co., Ltd., Osaka, Japan

[21] Appl. No.: 747,450

[22] Filed: Aug. 14, 1991

Related U.S. Application Data

[63] Continuation of Ser. No. 353,129, May 17, 1989, abandoned.

[30] Foreign Application Priority Data

May 18, 1988 [JP] Japan .................... 63-121025
Mar. 10, 1989 [JP] Japan ...................... 1-58345

[51] Int. Cl.$^5$ .................. G11B 5/008; H04B 1/08; H02G 3/08
[52] U.S. Cl. ........................ 360/93; 360/137; 455/351; 455/347; 174/52.1
[58] Field of Search .............. 360/88, 90, 92, 93, 360/95, 96.1, 96.5, 105, 137; 455/90, 95, 347, 351; 242/197; 174/52.1; 312/7.1

[56] References Cited

FOREIGN PATENT DOCUMENTS 473137 4/1951 Canada .................. 312/7.1
634373 3/1950 United Kingdom ......... 312/7.1

Primary Examiner—A. J. Heinz
Assistant Examiner—Jefferson Evans
Attorney, Agent, or Firm—Lowe, Price, LeBlanc & Becker

[57] ABSTRACT

A cassette tape recorder cabinet has an upper cabinet part and a lower cabinet part between which a mechanism base plate is provided to hold a tape cassette inserted into the recorder to drive a tape encased in the tape cassette. The upper and lower cabinet parts have respective front surfaces facing a tape-exposing side of the tape cassette and rear surfaces positioned opposite the front surfaces. The height of the front surface of the upper cabinet part is greater than that of the rear surface thereof, and the height of the front surface of the lower cabinet part is smaller than that of the rear surface thereof. The top surface of the upper cabinet is formed so as to be curved to accommodate the upper side of the tape cassette, and the lower cabinet part is similarly curved in correspondence with the top surface of the upper cabinet part, so that a wedge-like space is formed between the mechanism base plate and the lower cabinet to accommodate relatively large electrical parts at the rear side of the cassette tape recorder.

2 Claims, 3 Drawing Sheets

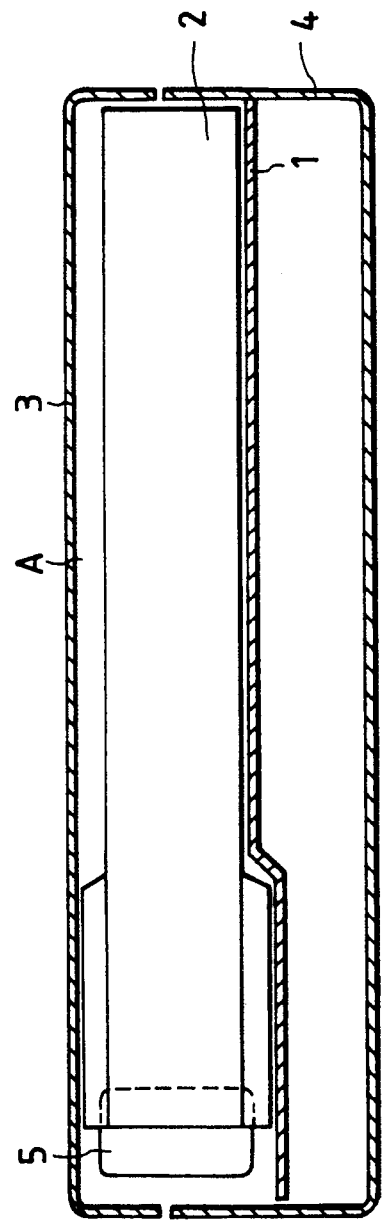
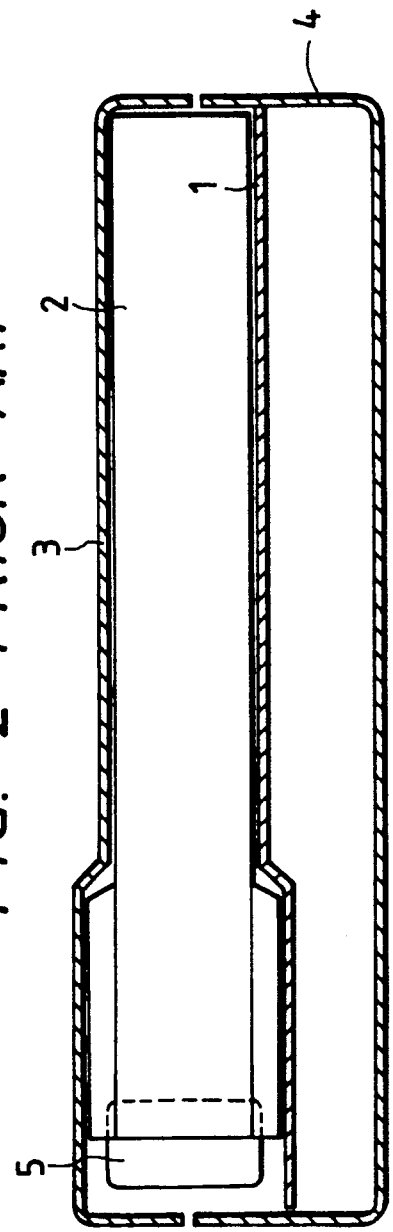

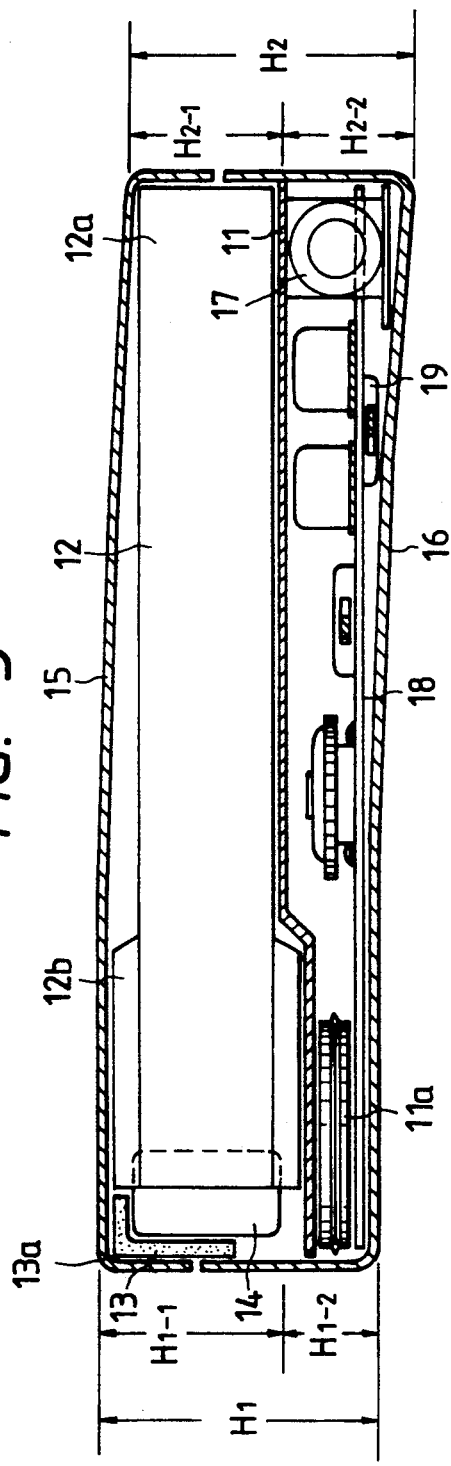
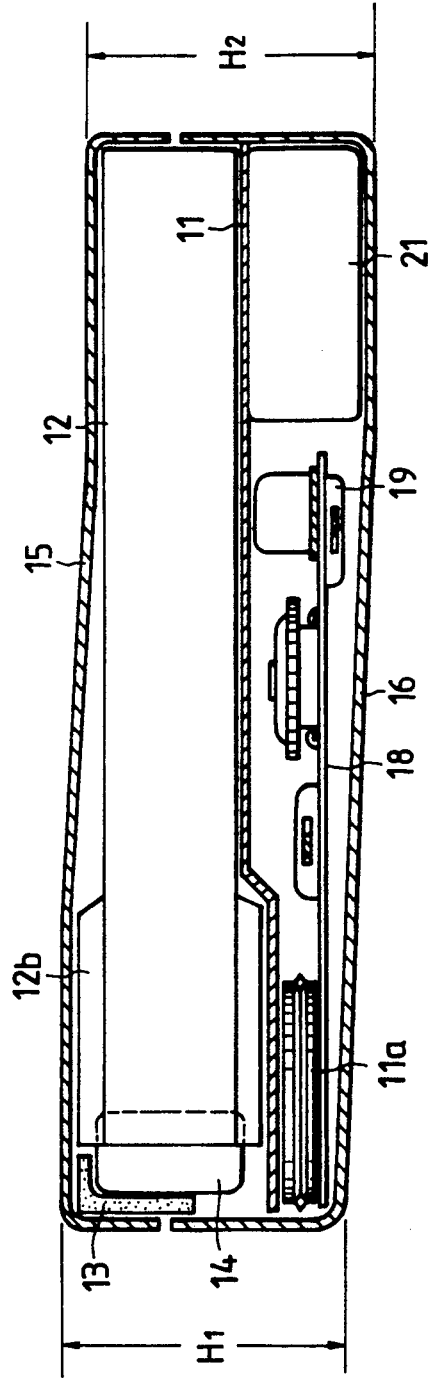

5,153,791

HIGHLY COMPACT CASSETTE PLAYER

This application is a continuation of application Ser. No. 07/353,129 filed May 17, 1989, now abandoned. A Highly Compact Casette Player

FIELD OF THE INVENTION

The present invention relates generally to cassette tape recorders, and more particularly to improvement of a structural arrangement or layout of a cassette tape recorder.

BACKGROUND OF THE PRIOR ART

An important problem in cassette tape recorders relates to size-reduction and thickness-reduction. The size-reduction and thickness-reduction greatly depend upon the configuration and structure of the cabinet of the cassette tape recorder, commensurate with the layout of parts to be encased therein. FIG. 1 is a cross-sectional view of a conventional cassette tape recorder comprising an upper cabinet part 3 and a lower cabinet part 4 which are combined with each other so as to encase a mechanism base plate 1 for keeping a tape cassette 2 thereon and driving a tape in the tape cassette 2 in connection with a magnetic head 5. As obvious from the same figure, this arrangement creates a relatively large space A because the tape cassette 2 has convex portions 6 at its front side. One conceivable solution is to form the upper cabinet 3 along a surface of the tape cassette 2 as illustrated in FIG. 2. However, this design consideration may result in lack of fit when put in a pocket of a user's dress for carrying thereby.

SUMMARY OF THE INVENTION

It is therefore an object of the present invention to provide a cassette tape recorder which is of reduced size and thickness, concurrently with a good fit.

These and other related objects, which will become apparent as the description proceeds, are realized by providing a cassette tape recorder according to the present invention which comprises an upper cabinet part and a lower cabinet part connected thereto between which a mechanism base plate is provided to hold a tape cassette inserted into the cassette tape recorder to allow driving of a tape encased in the tape cassette. The upper and lower cabinet parts have respective front surfaces facing a tape-exposing side of the tape cassette and rear surfaces positioned opposite the front surfaces. One feature of the present invention is that the height of the front surface of the upper cabinet part is greater than that of the rear surface thereof and the height of the front surface of the lower cabinet part is smaller than that of the rear surface thereof.

In one aspect of the invention, the top surface of the upper cabinet part is formed so as to be curved so as to accommodate closely the shape of the upper side of the tape cassette, and the lower cabinet part is similarly formed to be curved to match with the top surface of the upper cabinet part so that a wedge-like space is formed between the mechanism base plate and said lower cabinet so as to accommodate relatively large electrical parts of the recorder mechanism at the rear side of the cassette tape recorder.

BRIEF DESCRIPTION OF THE DRAWINGS

These objects and features of the present invention will become more readily apparent from the following detailed description taken in conjunction with the accompanying drawings, in which:

FIG. 1 is a cross-sectional view of a conventional cassette tape recorder;

FIG. 2 is a cross-sectional view of another conventional cassette tape recorder;

FIG. 3 is a cross-sectional view of a cassette tape recorder according to an embodiment of the present invention;

FIG. 5 is a cross-sectional view of a cassette tape recorder according to another embodiment of the present invention.

DETAILED DESCRIPTION OF THE INVENTION

Figure 4:
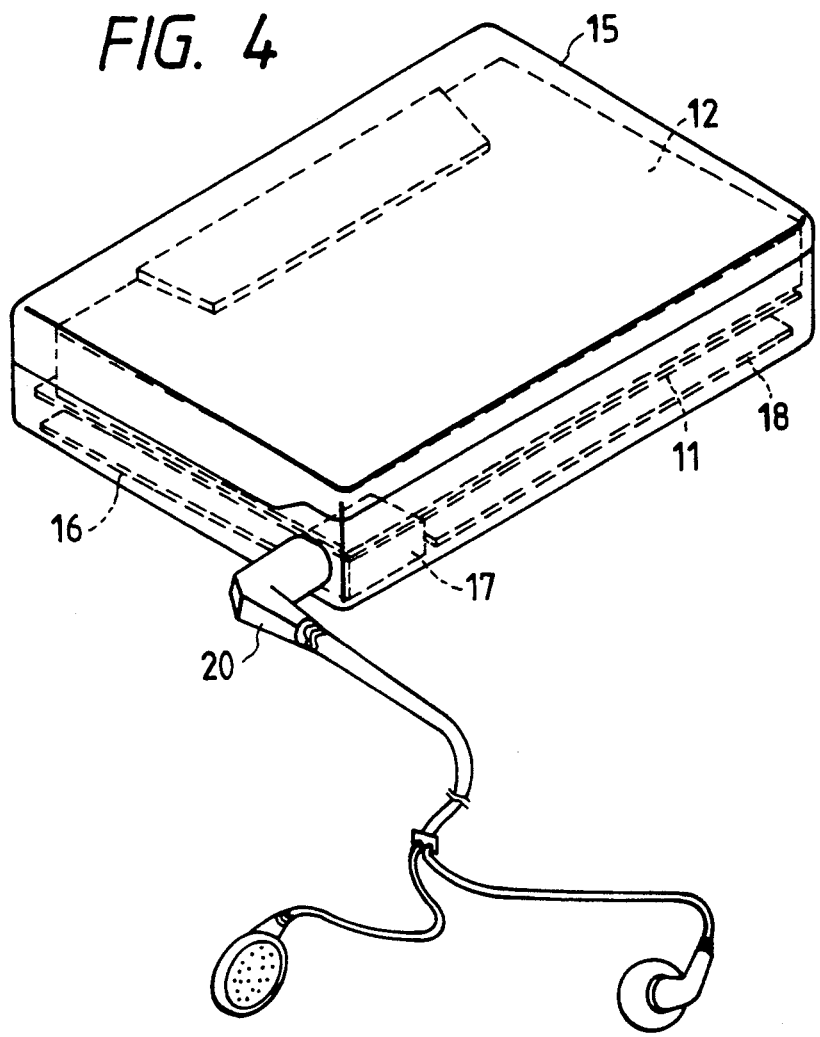
FIG. 4 is a perspective view of the FIG. 3 cassette tape recorder.

Referring now to FIGS. 3 and 4, there is schematically illustrated a cassette tape recorder according to a preferred embodiment of the present invention. In 3 and 4, the cassette tape recorder comprises an upper cabinet part 15, to serve as a cover, for mounting thereunder a tape cassette 12 formed to have convex portions at its front side, and a lower cabinet part 16 fitting to the upper cabinet part 15 as illustrated. In the lower cabinet part 16 is encased a mechanism base plate 11 having a flywheel 11a and a drive mechanism for recording on or reproducing from the tape in the tape cassette 12 mounted thereon.

The mechanism base plate 11 is fixedly supported by at least one inner side wall of the lower cabinet 16 so as to extend by a predetermined distance and to also extend toward the other inner side wall thereof after being bent so as to be fitted in a configuration matching with one surface of the tape cassette 12 mounted thereon. Below the mechanism base plate 11 is provided a printed circuit board 18 equipped with electric parts such as a jack 17 connected to a headphone plug 20, and a switch 19 for recording and reproducing of information signals.

The upper cabinet part 15 has at its inner side and front side a head block 13 provided with a magnetic head 14, a pinch roller (not shown) and the like, to be engageable with the tape cassette 12 mounted to the mechanism base plate 11. The top surface of the upper cabinet part 15 is curvedly upwardly with respect to the upper surface of the tape cassette so as to extend along an upper side edge portion 12a of the tape cassette 12 mounted on the mechanism base plate 11, an edge portion 12b of the convexed portion of the tape cassette 12 and an outer corner portion 13a of the head block 13. Similarly, the bottom surface of the lower cabinet part 16 is correspondingly curved so as to preferably be coaxial with the top surface of the upper cabinet part 15, i.e., to be similarly shaped, whereby the overall height $H_1$ of the front side of the cassette tape recorder becomes equal to the overall height $H_2$ of the rear side thereof. See FIG. 3.

In the entire cabinet comprising the upper cabinet part 15 and the lower cabinet part 16, with respect to the mechanical base plate 11 as shown in FIG. 3, the height of the front wall of the upper cabinet part 15 is $H_{1-1}$ and the height of the front wall of the lower cabinet part 16 is $H_{1-2}$. At the rear side, the rear wall of the upper cabinet part has an $H_{2-1}$ and the rear wall of the lower cabinet part 16 has a height $H_{2-2}$. $H_{1-1}$ is selected to be greater than $H_{2-1}$. Furthermore, at the lower side of the mechanical base plate 11, $H_{1-2}$ is selected to be smaller than $H_{2-2}$.

The above-mentioned arrangement allows a reduction of the space between the upper cabinet 15 and the tape cassette 12 and the formation of a useful wedge-like space between the mechanism base plate 11 and the lower cabinet 16 which is relatively large at the rear side of the cassette tape recorder and effectively permits provision of relatively large electrical parts such as jack 17, thereby resulting in an efficient layout of the electrical parts.

Figure 6:
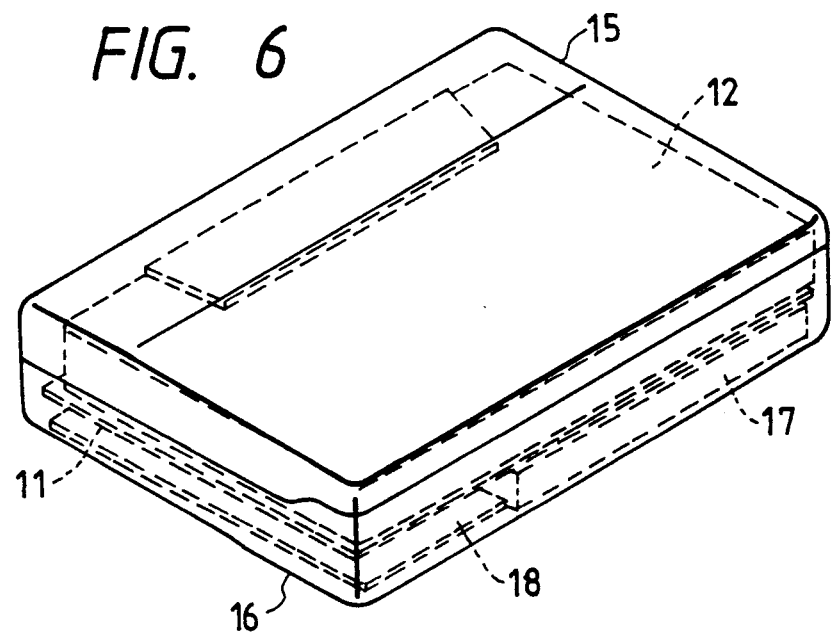
FIG. 6 is a perspective view of the FIG 5 cassette tape recorder.

FIGS. 5 and 6 show a cassette tape recorder according to another embodiment of this invention. Parts corresponding to those in FIGS. 3 and 4 are marked with the same numerals and the description thereof will be omitted for brevity. One difference between the first mentioned embodiment in FIGS. 3, 4 and the embodiment illustrated in FIGS. 5, 6 is in the configurations of the upper and lower cabinet parts 15, 16.

In FIGS. 5 and 6, the top surface of an upper cabinet part 15 is formed so as to extend from the rear side of the cassette tape recorder along the upper surface of the tape cassette 12 by a predetermined amount and then rise obliquely at an angle with respect to the upper surface of the tape cassette 12 toward a corner portion 12a of a convexed portion of the tape cassette 12 and then to extend along the upper surface of the convexed portion thereof. On the other hand, the bottom surface of the lower cabinet part 16 is formed so as to extend from the rear side of the cassette tape recorder by a predetermined distance so as to be in parallel with the mechanism base plate 11 and to then rise obliquely toward the front side of the cassette tape recorder, so that the overall height $H_1$ of the front side of the cassette tape recorder becomes equal to the overall height $H_2$ of the rear side thereof. This arrangement allows reduction of the space between the upper surface of tape cassette 12 and the top surface of the upper cabinet 15 and ensures accommodation of a box-like electrical device such as a nickel-cadmium battery 21, whose cross-section is square, at a portion near the rear side of the cassette tape recorder between the mechanism base plate 11 and the bottom surface of the lower cabinet 16. This results in a compact layout of the electrical parts and hence enables size-reduction and thickness-reduction of the cassette tape recorder without adversely affecting the fit of the cassette recorder in a user's pocket or the like. The predetermined distance of the bottom surface of the lower cabinet part 16 extending in parallel with the mechanism base plate 11 depends upon the dimension of the box-like electric device 21. In addition, a printed-circuit board 18 may be provided below the mechanism base plate 11 to be substantially parallel therewith.

It should be understood that the foregoing relates only to preferred embodiments of the present invention, and that it is intended to cover all changes and modifications of the embodiments of the invention herein used for the purposes of the disclosure, which do not constitute departures from the spirit and scope of the invention.

What is claimed is:

1. A cassette tape recorder, comprising:

mechanism base plate means having on a first end portion a head block including a head and pinch roller and further having on a second portion drive means for driving a tape of a tape cassette having a thick portion and a thin portion; and a cabinet assembly for encasing said mechanism base plate means, said cabinet assembly being composed of cooperating upper and lower cabinet parts so as to form an upper side space between said upper cabinet part and said mechanism base plate means and to further form a lower side space between said mechanism base plate means and said lower cabinet part, said upper side space being arranged to encase said tape cassette so that said tape cassette can be mounted on said mechanism base plate means, said upper cabinet part having a front side surface facing said thick portion side of said tape cassette encased in said upper side space and having a rear side surface in opposed relation to said front side surface, said upper side space being arranged to be substantially tapered from said front side surface to said rear side surface so that a height of said rear side surface is less than a height of said front side surface, and said lower side space being arranged so as to encase a printed board positioned to e substantially parallel to said mechanism base plate means, said lower cabinet part having a front side surface engaged with said front side surface of said upper cabinet part and a rear side surface engaged with said rear side surface of said upper cabinet part, and said lower side space being arranged to be substantially tapered from said rear side surface of said lower cabinet part to said front side surface thereof so that the total height of said front side surfaces of said upper and lower cabinet parts substantially becomes equal to the total height of said rear side surfaces of said upper and lower cabinet parts, wherein said lower side space is arranged so as to encase relatively large electric parts at a rear portion thereof, and a top surface of said upper cabinet part curves toward a plane parallel to and lying substantially in the base plate and a bottom surface of said lower cabinet part curves in a direction away from said plane to closely accommodate a known tape cassette having a convex front portion, whereby the front portion of said upper side space allows close accommodation of said convex portion of said tape cassette inserted therein and the rear portion of said lower side space allows accommodation of said relatively large electric parts.

2. A cassette tape recorder as claimed in claim 1, wherein:

the top surface of said upper cabinet part and the bottom surface of said lower cabinet part are smoothly curved from their front sides to their rear sides.

* * * * *